United States Patent
Chai et al.

(10) Patent No.: US 9,690,809 B1
(45) Date of Patent: Jun. 27, 2017

(54) DYNAMIC PARALLEL SAVE STREAMS

(71) Applicant: EMC Corporation, Hopkinton, MA (US)

(72) Inventors: Mu Chai, Bellevue, WA (US); Vladimir Mandic, San Jose, CA (US); Peter Armorer, Milton (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 529 days.

(21) Appl. No.: 14/091,237

(22) Filed: Nov. 26, 2013

(51) Int. Cl.
*G06F 17/30* (2006.01)

(52) U.S. Cl.
CPC .. *G06F 17/30289* (2013.01); *G06F 17/30091* (2013.01)

(58) Field of Classification Search
CPC .............................................. G06F 17/30091
USPC .......................................................... 707/649
See application file for complete search history.

(56) References Cited

U.S. PATENT DOCUMENTS

| | | | | |
|---|---|---|---|---|
| 6,377,996 B1* | 4/2002 | Lumelsky | ............... | H04L 29/06 709/203 |
| 6,505,216 B1* | 1/2003 | Schutzman | .......... | G06F 11/1456 707/202 |
| 8,832,706 B2* | 9/2014 | Gokhale | ............... | G06F 3/0613 709/201 |
| 2013/0336115 A1* | 12/2013 | Subramaniam | ....... | H04L 47/125 370/235 |

* cited by examiner

*Primary Examiner* — Chelcie Daye
(74) *Attorney, Agent, or Firm* — Blakely, Sokoloff, Taylor & Zafman LLP

(57) ABSTRACT

Exemplary methods for dynamically performing multiple save streams include in response to receiving a request to perform backup of an aggregate backup data, splitting the backup data into savepoints based on a splitting policy. In one embodiment, the method includes creating a first set of directors, each director responsible for backing up one of the savepoints. The method further includes allocating save streams to each of the directors, wherein each save stream is used by the corresponding director for backing up its savepoint. In one embodiment, in response to receiving an indication from a first director of the first set of directors that its savepoint has been backed up, creating a second set of directors, and allocating one or more save streams from a number of save streams freed by the first director to a second (unfinished) director from the first set of directors.

21 Claims, 7 Drawing Sheets

DYNAMIC PARALLEL SAVE STREAMS

FIELD OF THE INVENTION

Embodiments of the present invention relate generally to networking devices. More particularly, embodiments of the invention relate to dynamically balancing multiple save streams.

BACKGROUND

Data storage utilization is continually increasing, causing the proliferation of storage systems in data centers. In particular, the size of the applications and the data generated there from is increasing. Moreover, systems/users are backing up multiple copies of a given set of data to maintain multiple versions. For example, snapshots of a given database stored in a server are copied and stored over time, thereby allowing a given version/snapshot of a set of data to be restored. In order to increase backup performance (i.e., reduce the amount of time it takes to complete a backup process), backup applications perform parallel streaming of the backup data from the source storage system to the target storage system.

In order to perform parallel streaming, the backup application splits the backup data into multiple data sets (commonly known as savepoints). Depending on how many save streams are available, the backup application allocates each savepoint a predetermined number of save streams. Conventionally, the number of save streams allocated to each savepoint is static. They do not, for example, take into account the differences in the sizes of savepoints to be backed up with limited system parallelism resources. Further, once the save streams have been allocated and the backup process for a savepoint has started, conventional backup applications do not make use of save streams that have become available because another savepoint has finished backing up. Thus, when backing up several savepoints with uneven density, parallel streaming is not fully utilized.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
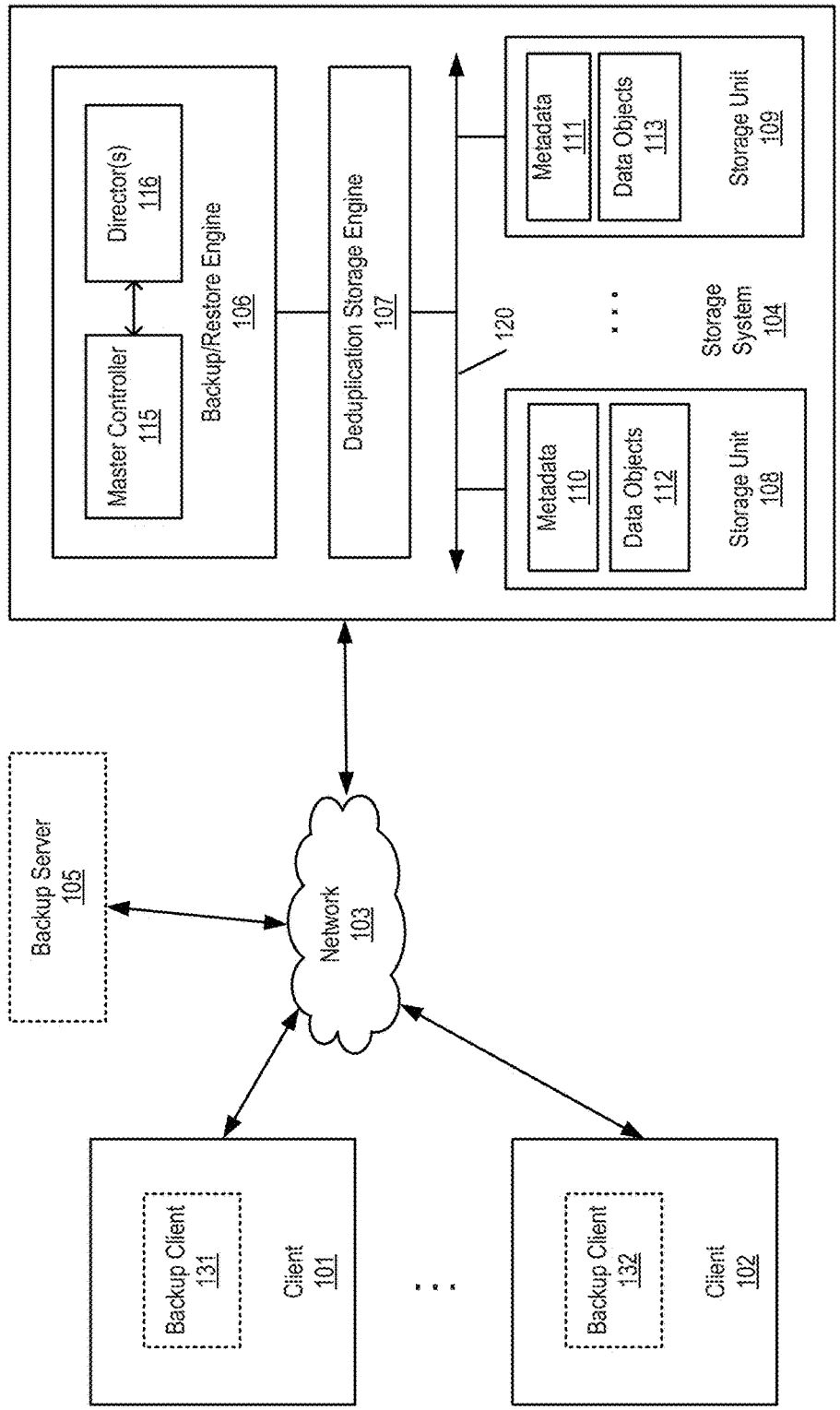
FIG. 1 is a block diagram illustrating a system for dynamically performing multiple save streams according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Parallel streaming is a mechanism for speeding up a backup process by allowing the backup operations to be performed in parallel, using parallel save streams (e.g., multiple writes may occur simultaneously). In the case of backing up several uneven data savepoints, conventional parallel streaming cannot fully utilize all save streams available to the backup system. By way of example, assume that there are four available save streams, and that there are two savepoints. The first savepoint has a size of two terabytes (TB) and the second savepoint has a size of two hundred gigabytes (GB). Assume further that the input/output (I/O) throughput per stream is 100 GB/hr. In this example, the backup starts with each savepoint using two streams. The 200-GB savepoint will finish in one hour using the two allocated save streams. The 2-TB savepoint will take another nine hour to finish with the two allocated save streams it started with. Thus, the backup operation requires a total of ten hours. The backup time can be reduced, however, if the two save streams freed up the first savepoint after the first hour can be leveraged by the second savepoint.

Some file systems, such as a high density NAS filer has millions of files. Such a file system can be divided into subdirectories such as/fs/directory-A, /fs/Directory-B, etc., and each subdirectory is configured as a source with a backup application. There is no load balancing, however, by the backup application once the sources are specified. Furthermore, pre-division into subdirectories usually requires significant initial and repeated effort to achieve decent load balancing. Pre-division load balancing might even be impossible, such as when there is a single large subdirectory which will be assigned to one stream and will therefore finish long after the smaller subdirectories' streams.

Embodiments of the present invention overcome the above limitations. According to one embodiment, a master controller receives a request to backup an aggregate backup data. The master controller splits the backup data into savepoints. In one embodiment, the master controller creates a director for each savepoint, and allocate one or more save streams to each of the directors for performing parallel streaming (i.e., backup) of the savepoints. In one aspect of the invention, the number of save streams allocated to each director is based on a streaming policy. The streaming policy enables the master controller to perform load balancing on the savepoints.

In one embodiment, the master controller monitors the created directors to determine when the directors are done backing up the respective savepoints. Once a director completes backing up a savepoint, its save streams become available for use by another director. In such an event, the master controller uses the newly available save streams to create one or more directors to backup the remaining savepoints. In one embodiment, once all savepoints have been associated with a director, save streams that become available are allocated to existing directors that are still performing backup of their savepoints. This allows all available save streams to be fully utilized at all times.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

In one embodiment, clients 101-102 include backup clients 131-132, respectively, for backing up data from locally attached devices (not shown) to storage system 104. Backup clients 131-132 can also be configured to restore data from storage system 104 to the locally attached devices. In one embodiment, system 100 may include backup server 105 communicatively coupled to clients 101-102 and storage system 104 via network 103. In such an embodiment, backup server 105 is configured to backup data from (e.g., from clients 101-102) to storage system 104. In one such embodiment, backup server 105 can also be configured to restore data from storage system 104 (e.g., to clients 101-102). In yet another embodiment, the backup/restore process can be performed by storage system 104, e.g., by backup/restore engine 106 of storage system 104, described in further details below. Thus, although throughout the description the backup/restore process is described as being performed by storage system 104, it shall be appreciated that the present invention is not so limited. The parallel streaming mechanisms of the present invention can be implemented at a client (e.g., at backup client 131 or 132) or at a backup server (e.g., backup server 105).

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a deduplicating storage system available from EMC® Corporation of Hopkinton, Mass.

In one embodiment, storage system 104 includes, but is not limited to, backup/restore engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be a combination of such devices. In the case of disk storage media, the storage units 108-109 may be organized into one or more volumes of Redundant Array of Inexpensive Disks (RAID).

In response to a data file to be stored in storage units 108-109, deduplication storage engine 107 is configured to segment the data file into multiple chunks according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 110-111, may be stored in at least some of storage units 108-109, such that files can be accessed independent of another storage unit. Metadata of each storage unit includes enough information to provide access to the files it contains. In one embodiment, metadata may include fingerprints contained within data objects 112-113, where a data object may represent a data chunk, a CR of data chunks, or a container of one or more CRs. Fingerprints are mapped to a particular data object via metadata 110-111, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, the storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

In one embodiment, storage system 104 includes one or more network interfaces (not shown) for communicating with other networked devices (e.g., clients 101-102). A network interface may be physical or virtual; and an interface address is an IP address assigned to a network interface, be it a physical network interface or virtual network interface. A physical network interface is hardware in a network device through which a network connection is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered (an network interface without an IP address). A loopback interface (and its loopback address) is a specific type of virtual network interface (and IP address) of a node (physical or virtual) often used for management purposes; where such an IP address is referred to as the nodal loopback address. The IP address(es) assigned to the network interface(s) of a network device, are referred to as IP addresses of that network device; at a more granular level, the IP address(es) assigned to network interface(s) assigned to a node implemented on a network device, can be referred to as IP addresses of that node.

In one embodiment, backup/restore engine 106 includes master controller 115 configured to receive backup requests (e.g., from backup server 105 and/or clients 101-102) to backup data (e.g., to storage units 108-109). In one embodiment, the backup data is an aggregate backup data. As used herein, an "aggregate backup data" refers to backup data that has been aggregated from multiple sources (e.g., clients). In one embodiment, master controller 115 splits the aggregate backup data into data sets, which shall herein be referred to as "savepoints". As used herein, a "savepoint" refers to a filesystem path that needs to be baked up. For example, a savepoint can be a drive or a directory or an application object.

In one embodiment, master controller 115 creates one or more director(s) 116, each configured to backup a savepoint. As used herein, a "director" refers to a software thread or process with or without dedicated hardware resources. Alternatively, a director can be finite state machine (FMS) implemented in hardware that is controlled by software. Thus, for example, as used herein, "creating" a director refers to either creating a software thread/process or enabling of hardware resources to perform a backup.

Depending on how many save streams are available, not all directors may be created at the same time. For example, due to a constraint on the number of available save streams, master controller 115 may create directors for some, but not all, savepoints. As save streams become freed up (e.g., by directors that have completed backing up their savepoints), new directors can be created to backup the remaining savepoints. Once a director has been created for each of the savepoint, save streams that are freed are posted to existing directors that are still performing the backup. In this way, the directors can leverage off save streams that would otherwise be left unutilized.

As used herein, a "save stream" refers to a collection of resources that are required to perform backup. The resources may include software and/or hardware (e.g., processor core, memory, threads). Throughout the description, a save stream may simply be referred to as stream. As described above, although master controller 115 and director(s) 116 are illustrated as part of storage system 104, it shall be understood that either or both of these modules can be implemented as part of backup clients 131-132 or backup server 105.

Figure 2:
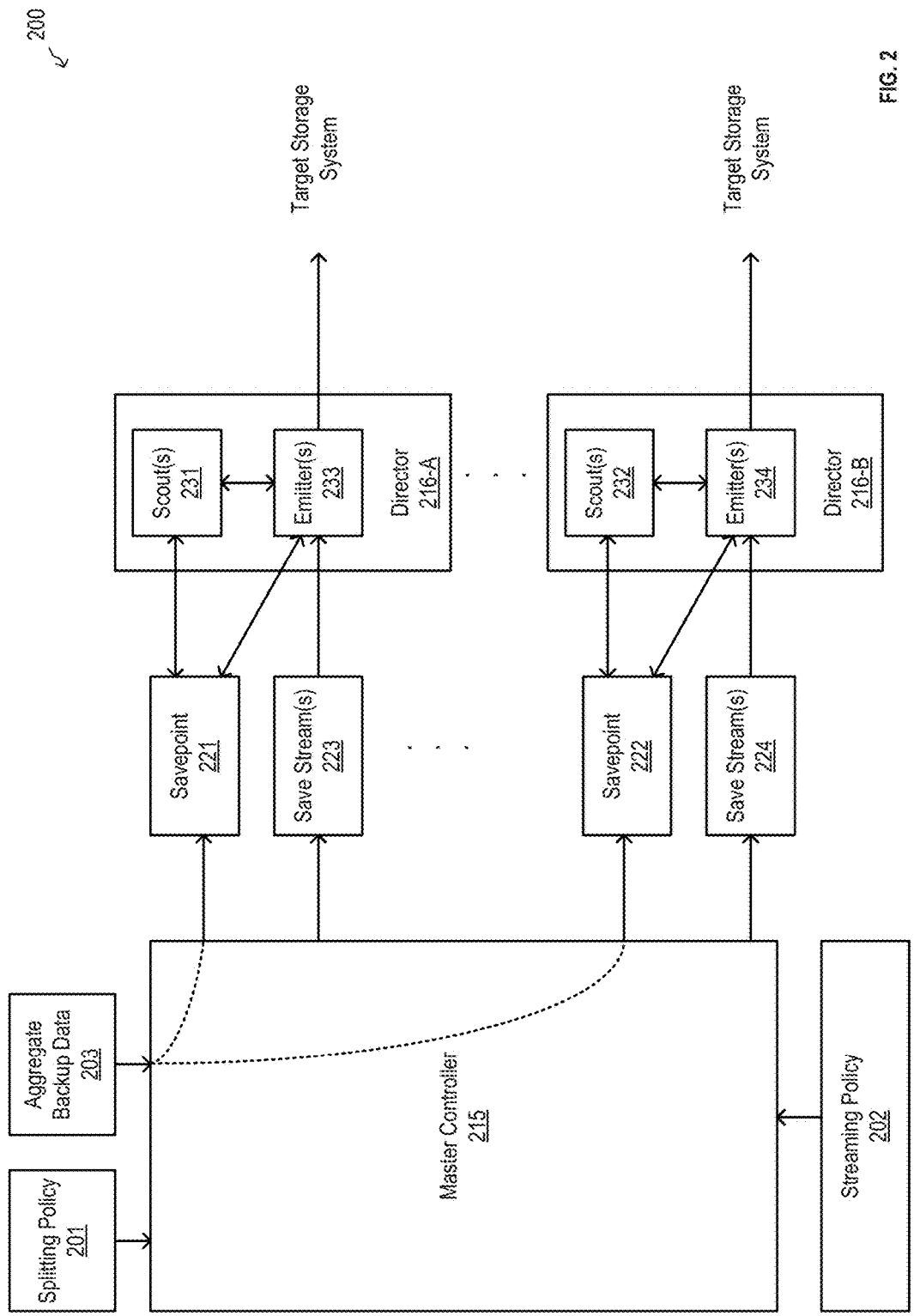
FIG. 2 is a block diagram illustrating a system for dynamically performing multiple save streams according to one embodiment.

FIG. 2 is a block diagram illustrating backup system 200 according to one embodiment. For example, backup system 200 may be implemented as part of backup/restore engine 106. Backup system 200 includes master controller 215, which can be implemented as part of master controller 115. In one embodiment, master controller 215 is configured to receive aggregate backup data 203 (e.g., from clients 101-102 and/or backup server 105). According to one embodiment, master controller 215 splits aggregate backup data 203 into savepoints based on splitting policy 201. For example, splitting policy 201 can be configured to cause master controller 215 to split aggregate backup data 203 differently depending on the density of the file system. In the illustrated example, master controller 215 splits aggregate backup data 203 into savepoints 221-222. One having ordinary skill in the art would recognize that aggregate backup data 203 can be split into more or less savepoints than as illustrated.

According to one embodiment, master controller 215 is configured to create a director for each of the savepoints based on streaming policy 202. For example, streaming policy 202 can be configured to cause master controller 215 to allocate a predetermined number of save streams to each director. As described above, in some instances, not all directors are created at the same time. By way of example, and not limitation, assume that the total number of available save streams is 10, and there are 3 savepoints. Assume further that streaming policy 202 is configured such that each director is allocated with 5 streams. In such a configuration, only 2 directors can be initially created because these 2 directors have utilized all available streams. The director for the third savepoint can be created only after one of the first 2 directors have completed backing up its savepoint and frees up the streams. In the illustrated example, directors 216-A through 216-B have been created to backup savepoints 221-222, respectively. Directors 216-A through 216-B can be implemented as part of directors 116. In one embodiment, streaming policy 202 also determines how save items (e.g., files, directories and application objects) are sent from scout(s) to directors, and directors to emitters.

According to one embodiment, streaming policy 202 is configured such that the number of streams allocated to each savepoint can be different. In one such embodiment, streaming policy 202 is configured such that it causes master controller 215 to allocate streams based on density of the file system to which the savepoint belongs. For example, streaming policy 202 can be configured such that it causes master controller 215 to allocate more save streams to a savepoint that belongs to a large file system, and less streams to a savepoint that belongs to a small file system. In this way, master controller 215 can perform load balancing on aggregate backup data 203.

According to one embodiment, each director includes one or more scouts. As used herein, a "scout" refers to a process of traversing a file system (e.g., a savepoint) in order to discover save items and reporting the save items to a director. A scout can be implemented as software, firmware, hardware, or any combination thereof. As used herein, a "save item" refers to an item that needs to be "saved" (i.e., backed up). A save item, for example, can be a directory, a file, or an application object. As illustrated, directors 216-A through 216-B include scout(s) 231-232, respectively.

According to one embodiment, each director includes one or more emitters. As used herein, an "emitter" refers to a process of backing up save items (e.g., save items discovered by the scouts) to a target storage system (e.g., storage units 108-109). An emitter can be implemented as software, firmware, hardware, or any combination thereof. As illustrated, directors 216-A through 216-B include emitters(s) 233-234, respectively.

Figure 3:
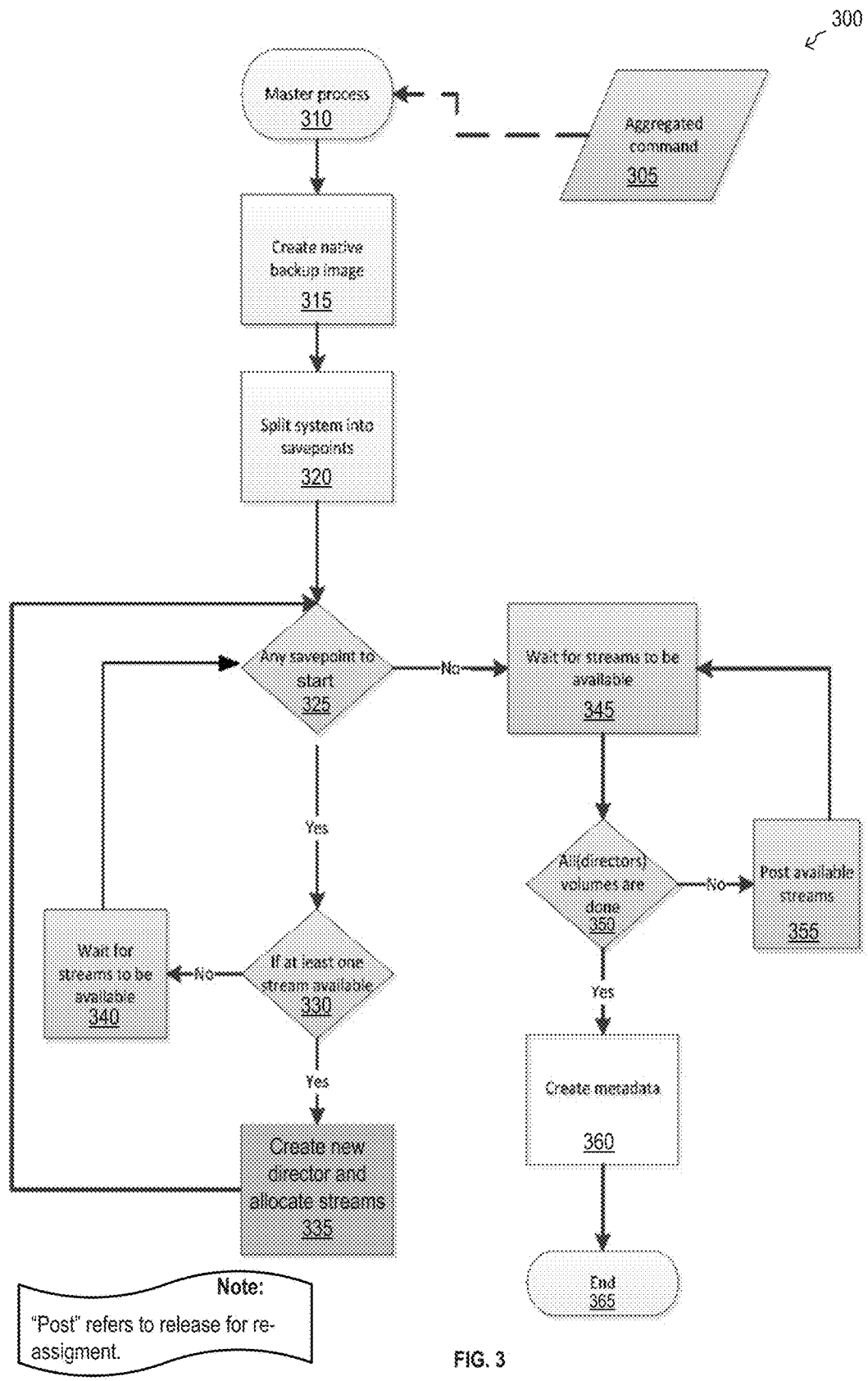
FIG. 3 is a flow diagram illustrating a method for dynamically performing multiple save streams according to one embodiment.

FIG. 3 is a flow diagram illustrating method 300 for dynamically performing multiple save streams according to one embodiment. For example, method 300 can be performed by master controller 215, which can be implemented as software, firmware, hardware, or any combination thereof. Referring now to FIG. 3, at block 305, an aggregated command is sent by a device (e.g., clients 101-102 and/or server 105). As used herein, an aggregated command refers to a request to backup an aggregate backup data such as aggregate backup data 203.

At block 310, the master controller receives the aggregated command. At block 315, in response to receiving the aggregated command, the master controller creates a native backup image. As used herein, a "native backup image" refers to a primary backup provided by a storage system. A native backup image can be, for example, a snapshot of a Network Attached Storage (NAS) system, or a ShadowCopy of a Windows® server.

At block 320, the master controller splits the aggregated backup data into savepoints. For example, master controller 215 splits aggregate backup data 203 into savepoints 221-222 based on splitting policy 201, each representing a portion of the aggregated backup data. At block 325, the master controller determines if there is any savepoint (e.g., savepoints 221-222) to be processed. Here, a "processed" savepoint refers to a savepoint for which a director has been created and the backup has started. In response to determining that at least one savepoint remains to be processed, the master controller proceeds to block 330.

At block 330, the master controller determines if at least one save stream is available (i.e., not allocated to an existing director). At block 335, in response to determining at least one save stream is available, the master controller creates a new director (e.g., director 216-A). In one embodiment, as part of block 335, the master controller allocates the director with one or more save streams (e.g., save streams 223) based on a policy such as streaming policy 202. Alternatively, at block 340, in response to determining that all save streams have been allocated to existing directors, the master controller waits for a save stream to be freed (e.g., by an existing director which has completed backing up its savepoint). Once an available save stream is detected, the master controller returns to block 325.

Referring now back to block 325. In response to determining that all savepoints have been processed, the master controller proceeds to block 345. At block 345, the master controller waits for at least one save stream to be available (i.e., freed by an existing director). In response to determining at least one save stream has become available, the master controller proceeds to block 350.

At block 350, the master controller determines if all directors have completed backing up their respective savepoints. Conventionally, once a backup process similar to the director has been started, save streams can no longer be added to the process. Thus, a conventional backup process is not able to utilize save streams that are otherwise free and completely unutilized. The master controller of the present invention overcomes this limitation by posting newly available save streams to existing directors that are still backing up their savepoints. At block 355, in response to determining at least one director is not done backing up its savepoint, the master controller posts the newly available save streams to the running (i.e., unfinished) director. In this way, the director is able to utilize save streams that would otherwise be left unutilized. Note that the newly available (i.e., freed) save streams are posted for existing directors only if all savepoints have been processed. For example, if at least one savepoint has not been allocated a director, then the newly available save streams will be utilized to create a new director (e.g., as part of block 335) for such unprocessed savepoint, rather than being posted (e.g., as part of block 355) to an existing director. Once the newly available save streams are posted, the master controller returns to block 345 and waits for another save stream to become available.

Referring now back to block 350. In response to determining all directors have completed backing up their savepoints, the master controller proceeds to block 360. At block 360, the master controller creates and saves metadata (e.g., metadata 110-111) of the backed up savepoints, and the process is completed at block 365.

Figure 4:
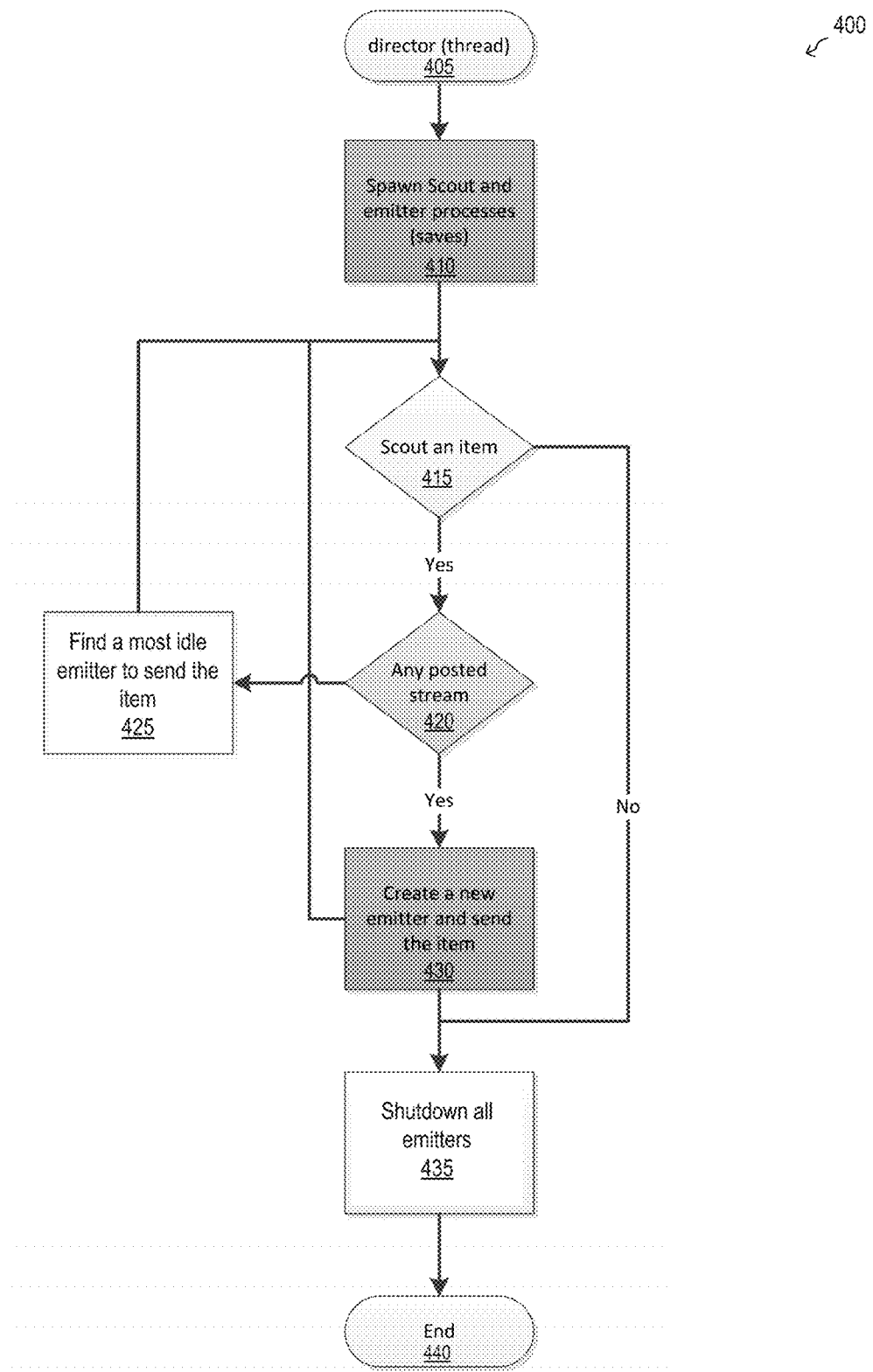
FIG. 4 is a flow diagram illustrating a method for dynamically performing multiple save streams according to one embodiment.

FIG. 4 is a flow diagram illustrating method 400 for dynamically performing multiple save streams according to one embodiment. For example, method 400 can be performed by one of directors 216-A through 216-B, which can be implemented as software, firmware, hardware, or any combination thereof. Referring now to FIG. 4, at block 405, the director is created (e.g., by master controller 215 as part of block 335). As part of block 405, the director has been allocated with at least one save stream by the master controller.

At block 410, the director spawns one or more scouts (e.g., scouts 231 or 232) in order to discover save items from a savepoint (e.g., savepoint 221 or savepoint 222). As part of block 410, the director also spawns one or more emitters (e.g., emitters 233 or 234) in order to backup the discovered save items to a target storage system. As used herein, "spawning" refers to the loading and executing of a child process (e.g., a scout or an emitter) by a parent process (e.g., method 400). Once a child process is spawned, the parent process can wait for the child process to complete before proceeding. Alternatively, the parent process can proceed to perform other operations asynchronously without waiting for the spawned child process to complete. In one embodiment, once the scout(s) and emitter(s) are spawned, the director proceeds without waiting for the scout(s) and emitter(s) to complete.

At block 415, the director determines whether a save item has been scouted (e.g., whether a directory, file, or application object from the savepoint has been discovered for backup). In response to determining a save item has been scouted, the director proceeds to block 420. At block 420, the director determines whether any save stream has been posted by the master controller (e.g., as part of block 355) since the time the director was created at block 405. In other words, at block 420, the director determines if any new save streams have become available since the director was initially created.

In response to determining no save stream has been posted, the director proceeds to block 425 to find a most idle (or least busy) emitter to send the discovered save item to. As used herein, an "idle" emitter refers to an emitter that is not performing a backup. Once the scouted save item has been sent to an idle emitter, the director returns back to block 415 to determine if another save item has been scouted.

Returning now back to block 420. In response to determining at least one save stream has been posted by the master controller, the director creates a new emitter using the posted save stream. In this way, the director is able to utilize newly freed save streams that would otherwise be left unutilized, thereby increasing its backup performance by reducing the amount of time required to perform a backup. The director sends the discovered save item to the newly created emitter in order to backup the save item. Once the save item has been sent to the new emitter, the director returns to block 415 to determine if another save item has been scouted. At block 415, in response to determining no more save items have been scouted (i.e., all save items from the savepoint has been backed up), the director proceeds to block 435 and shuts down all emitters, and the process is completed at block 440.

Figure 5:
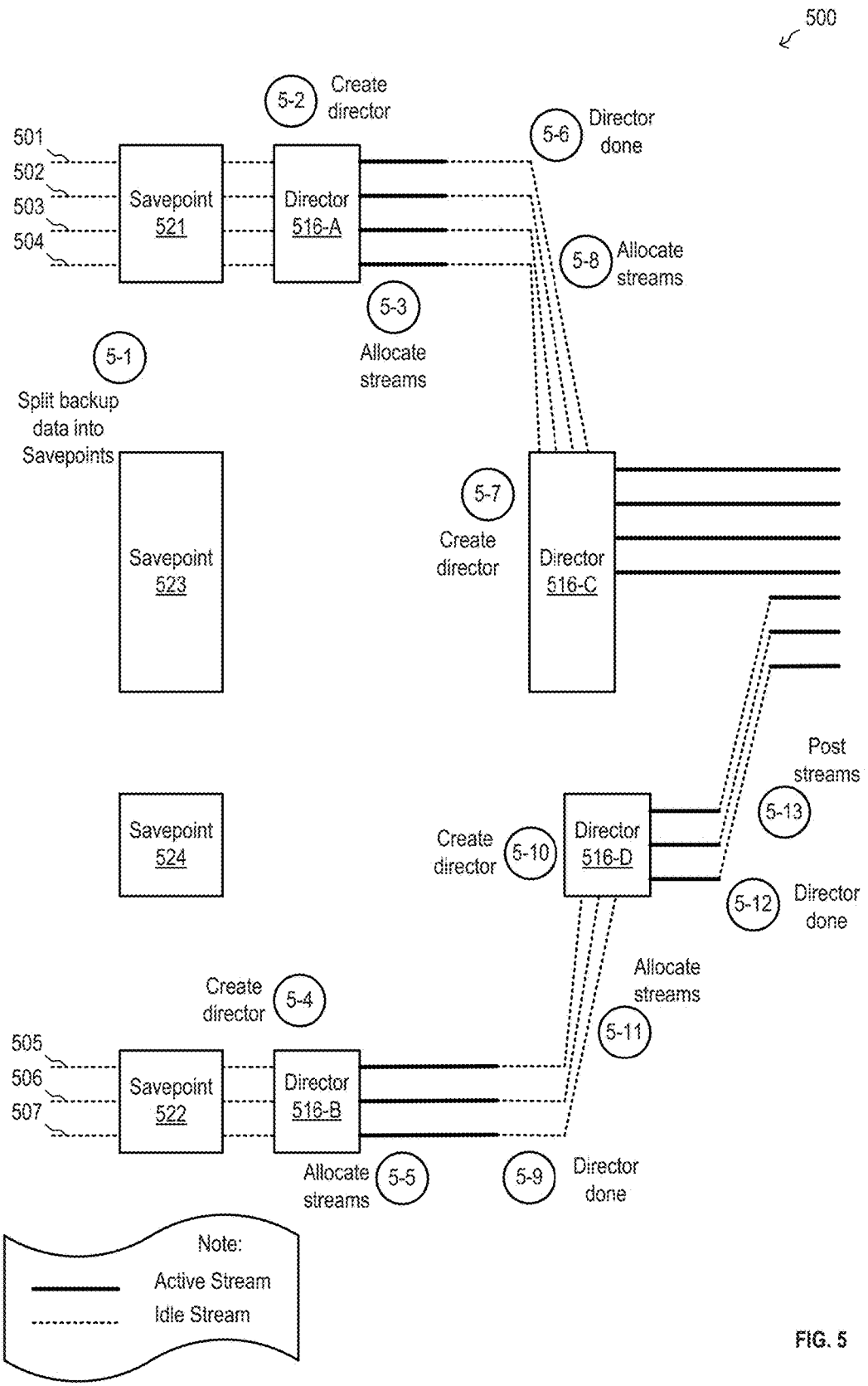
FIG. 5 is a block diagram illustrating a process flow for dynamically performing multiple save streams according to one embodiment.

FIG. 5 is a block diagram illustrating process flow 500 for dynamically performing multiple save streams according to one embodiment. For example, the transactions of process flow 500 can be performed by master controller 115 and directors 116. Process flow 500 assumes that there are 7 available save streams (i.e., save streams 501-507). At transaction 5-1, in response to receiving a request to perform a backup, the master controller splits the aggregated backup data into savepoints 521-524 (e.g., as part of block 320).

At transaction 5-2, the master controller creates new director 516-A, which can be implemented as part of directors 116. At transaction 5-3, the master controller allocates save streams 501-504 to director 516-A. Transactions 5-2 and 5-3 can be implemented as part of block 335. At this point, only save streams 505-507 remain available for allocation. At transaction 5-4, the master controller creates new director 516-B, which can be implemented as part of directors 116. At transaction 5-5, the master controller allocates save streams 505-507 to director 516-B. Transactions 5-4 and 5-5 can be implemented as part of block 335. At this point, there are no more available save streams to be allocated. Thus, the master controller must wait (e.g., at block 340) for save streams to be freed by either director 516-A or 516-B before another director can be created for savepoint 523 or 524.

At transaction 5-6, director 516-A completes backing up its savepoint 521, and frees up save streams 501-504. At transaction 5-7, the master controller creates new director 516-C to backup savepoint 523. At transaction 5-8, the master controller allocates save streams 501-504 to director 516-C. Transactions 5-7 through 5-8 can be implemented as part of block 335.

At transaction 5-9, director 516-B completes backing up its savepoint 522, and frees up save streams 505-507. At transaction 5-10, the master controller creates new director 516-D to backup savepoint 524. At transaction 5-11, the master controller allocates save streams 505-507 to director 516-D. Transactions 5-10 through 5-11 can be implemented as part of block 335.

At transaction 5-12, director 516-D completes backing up its savepoint 524, and frees up save streams 505-507. At transaction 5-13, in response to determining all savepoints have been processed (e.g., as part of block 325), the master controller posts newly available save streams 505-507 to director 516-C (e.g., as part of block 355) because director 516-C has not completed backing up its savepoint. Conventionally, newly available save streams 505-507 would be left unutilized because they cannot be added to director 516-C, since director 516-C has already started its backup operations. The present invention overcomes this limitation by allowing a director in progress (e.g., director 516-C) to make use of the save streams.

Figure 6:
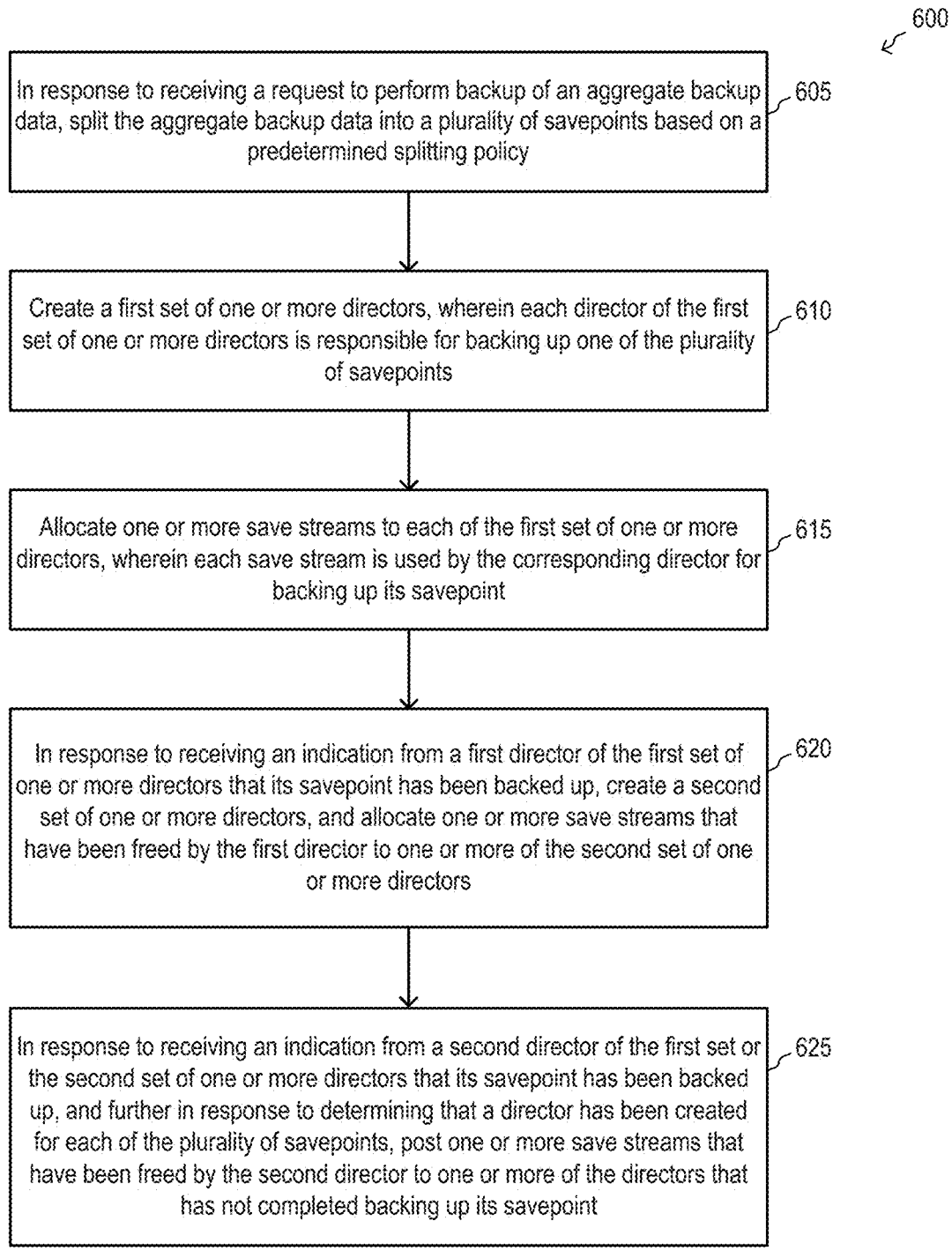
FIG. 6 is a flow diagram illustrating a method for dynamically performing multiple save streams according to one embodiment.

FIG. 6 is a flow diagram illustrating method 600 for dynamically performing multiple save streams according to one embodiment. For example, method 600 can be performed by master controller 215, which can be implemented as software, firmware, hardware, or any combination thereof.

Referring now to block 605, in response to receiving a request to perform backup of an aggregate backup data, the master controller splits the aggregate backup data (e.g., aggregate backup data 203) into a plurality of savepoints (e.g., savepoints 521-524) based on a predetermined splitting policy (e.g., splitting policy 201). The operations of block 605, for example, can be performed as part of transaction 5-1.

At block 610, the master controller creates a first set of one or more directors (e.g., directors 516-A-516-B), wherein each director of the first set of one or more directors is responsible for backing up one of the plurality of savepoints. The operations of block 610, for example, can be performed as part of 5-2 and/or 5-4. At block 615, the master controller allocates one or more save streams (e.g., save streams 501-507) to each of the first set of one or more directors, wherein each save stream is used by the corresponding director for backing up its savepoint. The operations of block 610, for example, can be performed as part of transactions 5-3 and/or 5-5.

At block 620, in response to receiving an indication from a first director (e.g., director 516-B) of the first set of one or more directors that its savepoint has been backed up, the master controller creates a second set of one or more directors (e.g., director 516-D), wherein each director of the second set of one or more directors is responsible for backing up one of the plurality of savepoints, and allocates one or more save streams (e.g., save streams 505-507) from a number of save streams freed by the first director to one or more of the second set of one or more directors. The operations of block 620, for example, can be performed as part of transactions 5-9 through 5-11.

At block 625, in response to receiving an indication from a second director (e.g., director 516-D) of the first set or the second set of one or more directors that its savepoint has been backed up, and further in response to determining that a director has been created for all of the plurality of savepoints, the master controller posts one or more save streams (e.g., save streams 505-507) from the number of save streams freed by the second director to one or more of the directors (e.g., director 516-C) that has not completed backing up its savepoint. The operations of block 625, for example, can be performed as part of transactions 5-12 through 5-13.

Figure 7:
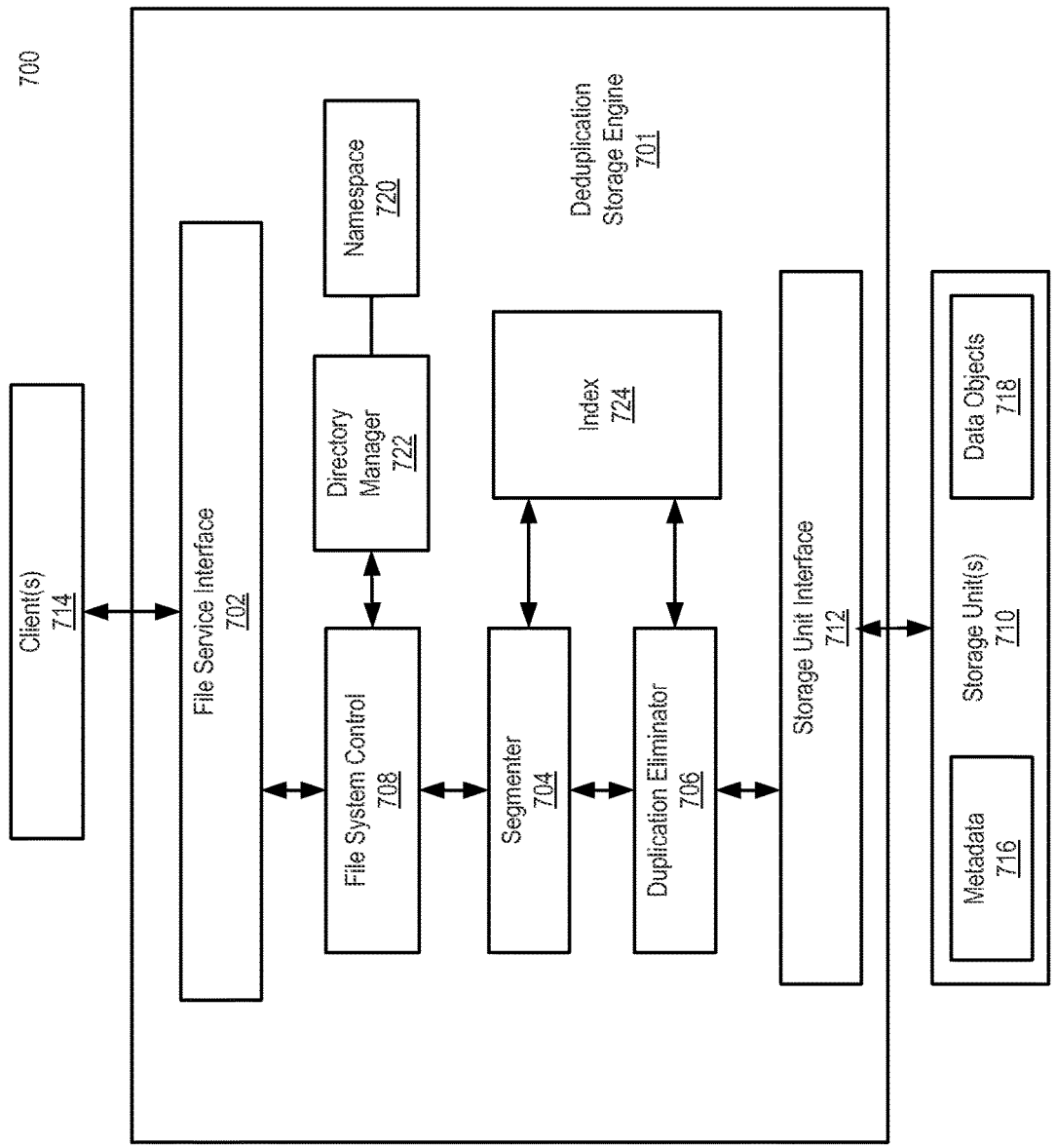
FIG. 7 is a block diagram illustrating a deduplication storage engine which can be used with embodiments of the invention.

FIG. 7 is a block diagram illustrating a deduplication storage system according to one embodiment of the invention. For example, deduplication storage system 700 may be implemented as part of a deduplication storage system as described above, such as, for example, the deduplication storage system as shown in FIG. 1. In one embodiment, storage system 700 may represent a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 700 may have a distributed architecture, or all of its components may be integrated into a single unit. Storage system 700 may be implemented as part of an archive and/or backup system such as a deduplicating storage system available from EMC® Corporation of Hopkinton, Mass.

In one embodiment, storage system 700 includes a deduplication engine 701 interfacing one or more clients 714 with one or more storage units 710 storing metadata 716 and data objects 718. Clients 714 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 710 may be implemented locally (e.g., single node operating environment) or remotely (e.g., multi-node operating environment) via an interconnect, which may be a bus and/or a network. In one embodiment, one of storage units 710 operates as an active storage to receive and store external or fresh user data, while the another one of storage units 710 operates as a target storage unit to periodically archive data from the active storage unit according to an archiving policy or scheme. Storage units 710 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 710 may also be combinations of such devices. In the case of disk storage media, the storage units 710 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 716, may be stored in at least some of storage units 710, such that files can be accessed independent of another storage unit. Metadata of each storage unit includes enough information to provide access to the files it contains. In one embodiment, metadata may include fingerprints contained within data objects 718, where a data object may represent a data segment, a compression region (CR) of data segments, or a container of one or more CRs. Fingerprints are mapped to a particular data object via metadata 716, enabling the system to identify the location of the data object containing a segment represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit identifier identifying a storage unit in which the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, deduplication storage engine 701 includes file service interface 702, segmenter 704, duplicate eliminator 706, file system control 708, and storage unit interface 712. Deduplication storage engine 701 receives a file or files (or data item(s)) via file service interface 702, which may be part of a file system namespace 720 of a file system associated with the deduplication storage engine 701. The file system namespace 720 refers to the way files are identified and organized in the system. An example is to organize the files hierarchically into directories or folders, which may be managed by directory manager 722. File service interface 712 supports a variety of protocols, including a network file system (NFS), a common Internet file system (CIFS), and a virtual tape library interface (VTL), etc.

The file(s) is/are processed by segmenter 704 and file system control 708. Segmenter 704, also referred to as a content store, breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 708, also referred to as a file system manager, processes information to indicate the segment(s) association with a file. In some embodiments, a list of fingerprints is used to indicate segment(s) associated with a file. File system control 708 passes segment association information (e.g., representative data such as a fingerprint) to index 724. Index 724 is used to locate stored segments in storage units 710 via storage unit interface 712. Duplicate eliminator 706, also referred to as a segment store, identifies whether a newly received segment has already been stored in storage units 710. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 710 that make up the file. Segments are then packed by a container manager (which may be implemented as part of storage unit interface 712) into one or more storage containers stored in storage units 710. The deduplicated segments may be further compressed into one or more CRs using a variation of compression algorithms, such as a Lempel-Ziv algorithm before being stored. A container may contains one or more CRs and each CR may contain one or more deduplicated segments. A container may further contain the metadata such as fingerprints, type of the data segments, etc. that are associated with the data segments stored therein.

When a file is to be retrieved, file service interface 702 is configured to communicate with file system control 708 to identify appropriate segments stored in storage units 710 via storage unit interface 712. Storage unit interface 712 may be implemented as part of a container manager. File system control 708 communicates (e.g., via segmenter 704) with index 724 to locate appropriate segments stored in storage units via storage unit interface 712. Appropriate segments are retrieved from the associated containers via the container manager and are used to construct the requested file. The file is provided via interface 702 in response to the request. In one embodiment, file system control 708 utilizes a tree (e.g., a segment tree obtained from namespace 720) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 701 may be implemented in software, hardware, or a combination thereof. For example, deduplication engine 701 may be implemented in a form of executable instructions that can be stored in a machine-readable storage medium, where the instructions can be executed in a memory by a processor.

In one embodiment, storage system 700 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for dynamically allocating save streams in a storage system having multiple save streams and a master controller, the method comprising:

in response to receiving a request to perform backup of an aggregate backup data, splitting the aggregate backup data into a plurality of savepoints based on a predetermined splitting policy;

creating a first set of one or more directors, wherein each director of the first set of one or more directors is responsible for backing up one of the plurality of savepoints;

allocating one or more save streams to each director of the first set of one or more directors, wherein each save stream represents one or more resources used by an associated director for backing up its savepoint;

determining that all of the multiple save streams have been allocated and are in use by the one or more directors, and determining that one or more savepoints of the plurality of save points have not yet been assigned to a director; and in response to receiving an indication from a first director of the first set of one or more directors that its savepoint has been backed up and in response to receiving an indication that the one or more save streams allocated to the first director have been freed:
  creating, by the master controller, a new director;
  freeing the save streams allocated to the first director;
  allocating the freed save streams of the first director to the new director;
  backing up a savepoint of the one or more savepoints remaining to be backed up using the new director.

2. The method of claim 1, wherein in response to determining that all of the save streams in the plurality of save streams have been allocated to the plurality of directors:
  receiving an indication from a second director of the first set of one or more directors that its savepoint has been backed up, and in response to receiving an indication that the one or more save streams allocated to the second director have been freed:
  allocating one or more save streams that have been freed by the second director to one or more of the directors of the first set of one or more directors.

3. The method of claim 2, wherein a number of save streams allocated to each of the first set of one or more directors is based on a total number of available save streams.

4. The method of claim 3, wherein the number of save streams allocated to each of the first set of one or more directors is further based on a predetermined streaming policy indicating a number save streams to be allocated to each director.

5. The method of claim 4, wherein the number of save streams allocated to each of the first set of one or more directors is further based on size and density of each of the savepoints that the first set of one or more directors is responsible for backing up.

6. The method of claim 5, wherein creating the second set of one or more directors is based on the predetermined streaming policy and a number of save streams that has been freed by the first director which completed backing up its savepoint.

7. The method of claim 1, wherein the savepoint of the at least one of the directors in the first set has a greater density than the saveset of the another director in the first set.

8. A non-transitory computer-readable medium having computer instructions stored therein, which when executed by a processor, cause the processor to perform operations for dynamically allocating save streams in a storage system having multiple save streams and a master controller, the operations comprising:

in response to receiving a request to perform backup of an aggregate backup data, splitting the aggregate backup data into a plurality of savepoints based on a predetermined splitting policy;

creating a first set of one or more directors, wherein each director of the first set of one or more directors is responsible for backing up one of the plurality of savepoints;

allocating one or more save streams to each director of the first set of one or more directors, wherein each save stream represents one or more resources used by an associated director for backing up its savepoint;

determining that all of the multiple save streams have been allocated to the first set of directors and are in use by the one or more directors, and determining that one or more savepoints of the plurality of save points have not yet been assigned to a director; and in response to receiving an indication from a first director of the first set of one or more directors that its savepoint has been backed up and in response to receiving an indication that the one or more save streams allocated to the first director have been freed:
  creating, by the master controller, a new director;
  freeing the save streams allocated to the first director;
  allocating the freed save streams of the first director to the new director;
  backing up a savepoint of the one or more savepoints remaining to be backed up using the new director.

9. The non-transitory computer-readable medium of claim 8, wherein in response to determining that all of the save streams in the plurality of save streams have been allocated to the plurality of directors:
  receiving an indication from a second director of the first set of one or more directors that its savepoint has been backed up, and in response to receiving an indication that the one or more save streams allocated to the second director have been freed:
  allocating one or more save streams that have been freed by the second director to one or more of the directors of the first set of one or more directors.

10. The non-transitory computer-readable medium of claim 9, wherein a number of save streams allocated to each of the first set of one or more directors is based on a total number of available save streams.

11. The non-transitory computer-readable medium of claim 10, wherein the number of save streams allocated to each of the first set of one or more directors is further based on a predetermined streaming policy indicating a number save streams to be allocated to each director.

12. The non-transitory computer-readable medium of claim 11, wherein the number of save streams allocated to each of the first set of one or more directors is further based on size and density of each of the savepoints that the first set of one or more directors is responsible for backing up.

13. The non-transitory computer-readable medium of claim 12, wherein creating the second set of one or more directors is based on the predetermined streaming policy and a number of save streams that has been freed by the first director which completed backing up its savepoint.

14. The non-transitory computer-readable medium of claim 8, wherein the savepoint of the at least one of the directors in the first set has a greater density that the saveset of the another director in the first set.

15. A data processing system, comprising:
  a network interface configured to receive backup requests;
  a master controller, coupled to the network interface, wherein the master controller comprises at least one hardware processor coupled to a memory programmed with executable instructions that, when executed by the at least one hardware processor, configure the master controller to:

in response to receiving a request to perform backup of an aggregate backup data, split the aggregate backup data into a plurality of savepoints based on a predetermined splitting policy;

create a first set of one or more directors, wherein each director of the first set of one or more directors is responsible for backing up one of the plurality of savepoints;

allocate one or more save streams to each director of the first set of one or more directors, wherein each save stream represents one or more resources used by an associated director for backing up its savepoint;

determine that all of the multiple save streams have been allocated to the first set of directors and are in use by the one or more directors, and determining that one or more savepoints of the plurality of save points have not yet been assigned to a director; and in response to receiving an indication from a first director of the first set of one or more directors that its savepoint has been backed up and in response to receiving an indication that the one or more save streams allocated to the first director have been freed:

create, by the master controller, a new director;

free the save streams allocated to the first director;

allocate the freed save streams of the first director to the new director;

back up a savepoint of the one or more savepoints remaining to be backed up using the new director.

16. The data processing system of claim 15, wherein in response to determining that all of the save streams in the plurality of save streams have been allocated to the plurality of directors:

receiving an indication from a second director of the first set of one or more directors that its savepoint has been backed up:

allocate one or more save streams that have been freed by the second director to one or more of the directors of the first set of one or more directors.

17. The data processing system of claim 16, wherein a number of save streams allocated to each of the first set of one or more directors is based on a total number of available save streams.

18. The data processing system of claim 17, wherein the number of save streams allocated to each of the first set of one or more directors is further based on a predetermined streaming policy indicating a number save streams to be allocated to each director.

19. The data processing system of claim 18, wherein the number of save streams allocated to each of the first set of one or more directors is further based on size and density of each of the savepoints that the first set of one or more directors is responsible for backing up.

20. The data processing system of claim 19, wherein creating the second set of one or more directors is based on the predetermined streaming policy and a number of save streams that has been freed by the first director which completed backing up its savepoint.

21. The data processing system of claim 15, wherein the savepoint of the at least one of the directors in the first set has a greater density than the saveset of the another director in the first set.

* * * * *